US010127814B2

(12) United States Patent
Mitra et al.

(10) Patent No.: US 10,127,814 B2
(45) Date of Patent: Nov. 13, 2018

(54) ADVANCED V2X EVENT DISSEMINATION

(71) Applicant: Ford Global Technologies, LLC, Dearborn, MI (US)

(72) Inventors: Pramita Mitra, Bloomfield Hills, MI (US); Cynthia M. Neubecker, Westland, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/424,489

(22) Filed: Feb. 3, 2017

(65) Prior Publication Data

US 2018/0225970 A1 Aug. 9, 2018

(51) Int. Cl.
*G08G 1/16* (2006.01)
*H04L 29/08* (2006.01)
*G08G 1/09* (2006.01)

(52) U.S. Cl.
CPC ............... *G08G 1/161* (2013.01); *G08G 1/09* (2013.01); *G08G 1/164* (2013.01); *H04L 67/12* (2013.01)

(58) Field of Classification Search
CPC ........... G06K 9/00785; G06K 9/00798; G05D 1/0274; G05D 2201/0213; G07C 5/008; H04B 1/3822; H04H 60/51; H04N 21/25841; H04N 21/42202
See application file for complete search history.

(56) References Cited

U.S. PATENT DOCUMENTS

| 8,988,252 | B2 | 3/2015 | Scholl et al. | |
| 9,154,900 | B1* | 10/2015 | Addepalli | H04W 4/046 |
| 2004/0136355 | A1* | 7/2004 | Mori | H04W 4/12 370/349 |
| 2004/0230373 | A1* | 11/2004 | Tzamaloukas | G01C 21/28 701/468 |

(Continued)

FOREIGN PATENT DOCUMENTS

EP 2918141 B1 9/2015

OTHER PUBLICATIONS

Anna Maria Vegni, and Thomas D.C. Little, A Message Propagation Model for Hybrid Vehicular Communication Protocols, MCL Technical Report No. May 27, 2010, Boston University, Boston, Massachusetts, May 27, 2010.

(Continued)

*Primary Examiner* — Fekadeselassie Girma
(74) *Attorney, Agent, or Firm* — James P. Muraff; Neal, Gerber & Eisenberg LLP

(57) ABSTRACT

Disclosed is a host vehicle including: motor(s), sensors, processor(s) configured to: (i) package sensed data into a first unit; (ii) determine whether a vehicle-to-infrastructure connection is (a) active or (b) inactive; (iii) if (a), append a TRUE flag to the unit and if (b) append a FALSE flag to the unit; (iv) transmit the first appended unit over a vehicle-to-vehicle connection; (v) determine whether a second appended unit, received over a vehicle-to-vehicle connection, includes (c) a TRUE flag or (d) a FALSE flag; (vi) if (d), transmit the second appended unit over the vehicle-to-infrastructure connection; (vii) if (c), not transmit the second appended unit over the vehicle-to-infrastructure connection.

20 Claims, 8 Drawing Sheets

(56) References Cited

U.S. PATENT DOCUMENTS

| | | | |
|---|---|---|---|
| 2008/0046135 A1* | 2/2008 | Farrow | G07C 5/008 701/2 |
| 2008/0059057 A1* | 3/2008 | Tengler | G01C 21/3626 701/465 |
| 2008/0060613 A1* | 3/2008 | Bauerle | F02D 11/105 123/399 |
| 2009/0105949 A1* | 4/2009 | Bitan | G01C 21/3694 701/455 |
| 2009/0319163 A1* | 12/2009 | Sutter | G08G 1/0104 701/117 |
| 2010/0112935 A1* | 5/2010 | Minter | H04H 20/106 455/3.03 |
| 2012/0151073 A1* | 6/2012 | Bai | G06F 17/30902 709/228 |
| 2012/0202525 A1* | 8/2012 | Pettini | H04W 4/043 455/456.3 |
| 2013/0125166 A1* | 5/2013 | Minter | H04N 7/17318 725/36 |
| 2014/0257686 A1* | 9/2014 | Feldman | G06F 17/00 701/300 |
| 2014/0316635 A1* | 10/2014 | Bando | G05D 1/0274 701/25 |
| 2015/0281906 A1* | 10/2015 | Tseng | H04B 1/3822 455/456.3 |
| 2015/0296019 A1* | 10/2015 | Onishi | H04W 12/06 709/228 |
| 2015/0296411 A1* | 10/2015 | Meyer | G08G 1/0112 370/336 |
| 2016/0021178 A1 | 1/2016 | Liu et al. | |
| 2016/0071417 A1* | 3/2016 | Lewis | G08G 1/162 701/301 |
| 2016/0112962 A1 | 4/2016 | Park | |
| 2016/0133130 A1* | 5/2016 | Grimm | H04L 67/22 340/905 |
| 2016/0148512 A1 | 5/2016 | Menouar et al. | |
| 2016/0210853 A1* | 7/2016 | Koravadi | G08G 1/0141 |
| 2016/0242223 A1* | 8/2016 | Brahmi | H04W 28/021 |
| 2016/0259814 A1* | 9/2016 | Mizoguchi | G06F 17/30241 |
| 2016/0261705 A1* | 9/2016 | Lewandowski | H04L 67/2857 |
| 2017/0039084 A1* | 2/2017 | Atsmon | G06F 9/45558 |
| 2017/0098372 A1* | 4/2017 | Eilertsen | G08G 1/096775 |
| 2017/0104824 A1* | 4/2017 | Bajwa | H04W 4/025 |
| 2017/0193384 A1* | 7/2017 | Mudalige | G06N 7/005 |
| 2017/0208294 A1* | 7/2017 | Kawamura | H04N 7/183 |
| 2017/0274815 A1* | 9/2017 | Zelman | B60Q 1/44 |
| 2017/0314937 A1* | 11/2017 | Park | G01C 21/32 |
| 2017/0369055 A1* | 12/2017 | Saigusa | B60W 30/09 |

OTHER PUBLICATIONS

Kan Zheng, Lin Zhang, Wei Xiang, Heterogeneous Vehicular Networks.

Ruay-Shiung Chang, Lakhmi C. Jain, Sheng-Lung Peng, Advances in Intelligent Systems and Applications—vol. 1.

Jeffrey Miller, Vehicle-to-Vehicle-to-Infrastructure (V2V2I) Intelligent Transportation System Architecture, 2008 IEEE Intelligent Vehicles Symposium Eindhoven University of Technology Eindhoven, The Netherlands, Jun. 4-6, 2008.

Yan Zhang, Mohsen Guizani, Game Theory for Wireless Communications and Networking.

Search Report dated Jun. 27, 2018 for GB Patent Application No. GB 1801696.4 (5 Pages).

* cited by examiner

ADVANCED V2X EVENT DISSEMINATION

TECHNICAL FIELD

The present application relates to message propagation between (a) vehicles and (b) vehicles and servers.

BACKGROUND

Existing vehicles are configured to communicate with other vehicles via vehicle-to-vehicle (V2V) technology and to communicate with servers via vehicle-to-infrastructure (V2I) technology. Existing vehicles are thus V2X capable, meaning that they are capable of V2V and V2I communication. Existing vehicles are configured to generate driving outcomes based on sensed events. A new communication protocol is needed to relay sensed events between servers and between vehicles via V2X.

SUMMARY

Disclosed is a host vehicle including: motor(s), sensors, processor(s) configured to: (i) package sensed data into a first unit; (ii) determine whether a vehicle-to-infrastructure connection is (a) active or (b) inactive; (iii) if (a), append a TRUE flag to the unit and if (b) append a FALSE flag to the unit; (iv) transmit the first appended unit over a vehicle-to-vehicle connection; (v) determine whether a second appended unit, received over a vehicle-to-vehicle connection, includes (c) a TRUE flag or (d) a FALSE flag; (vi) if (d), transmit the second appended unit over the vehicle-to-infrastructure connection; (vii) if (c), not transmit the second appended unit over the vehicle-to-infrastructure connection.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
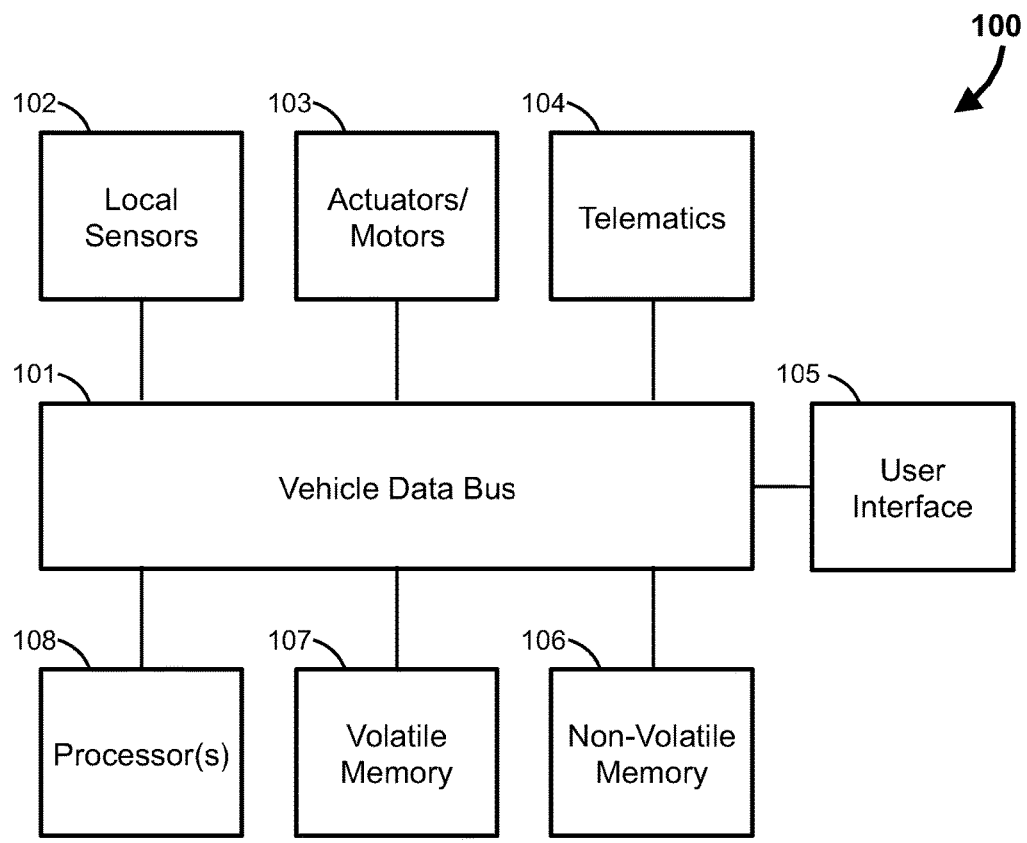
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of host vehicle 200. Host vehicle 200 is connected, meaning that host vehicle 200 is configured to (a) receive wireless data from external entities (e.g., infrastructure, servers, other connected vehicles) and (b) transmit wireless data to external entities. Host vehicle 200 may be autonomous, semi-autonomous, or manual. Host vehicle 200 includes a motor, a battery, at least one wheel driven by the motor, and a steering system configured to turn the at least one wheel about an axis. Host vehicle 200 may be fossil fuel powered (e.g., diesel, gasoline, natural gas), hybrid-electric, fully electric, fuel cell powered, etc.

Vehicles are described, for example, in U.S. patent application Ser. No. 15/076,210 to Miller, U.S. Pat. No. 8,180,547 to Prasad, U.S. patent application Ser. No. 15/186,850 to Lavoie, U.S. Patent Publication No. 2016/0117921 to D'Amato, and U.S. patent application Ser. No. 14/972,761 to Hu, all of which are hereby incorporated by reference in their entireties. Host vehicle 200 may include any of the features described in Miller, Prasad, Lavoie, D'Amato, and Hu.

Computing system 100 resides in host vehicle 200. Computing system 100, among other things, enables automatic control of mechanical systems within host vehicle 200 and facilitates communication between host vehicle 200 and external entities (e.g., connected infrastructure, the Internet, other connected vehicles). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touch-screen displays, keyboards, buttons, and other devices that enable user interaction with the computing system. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, motors mounted to sensors (e.g., a motor configured to swivel a local sensor 102), engines, power train motors, steering, blind spot warning lights, etc.

Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors, clocks, moisture sensors, rain sensors, light sensors, etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
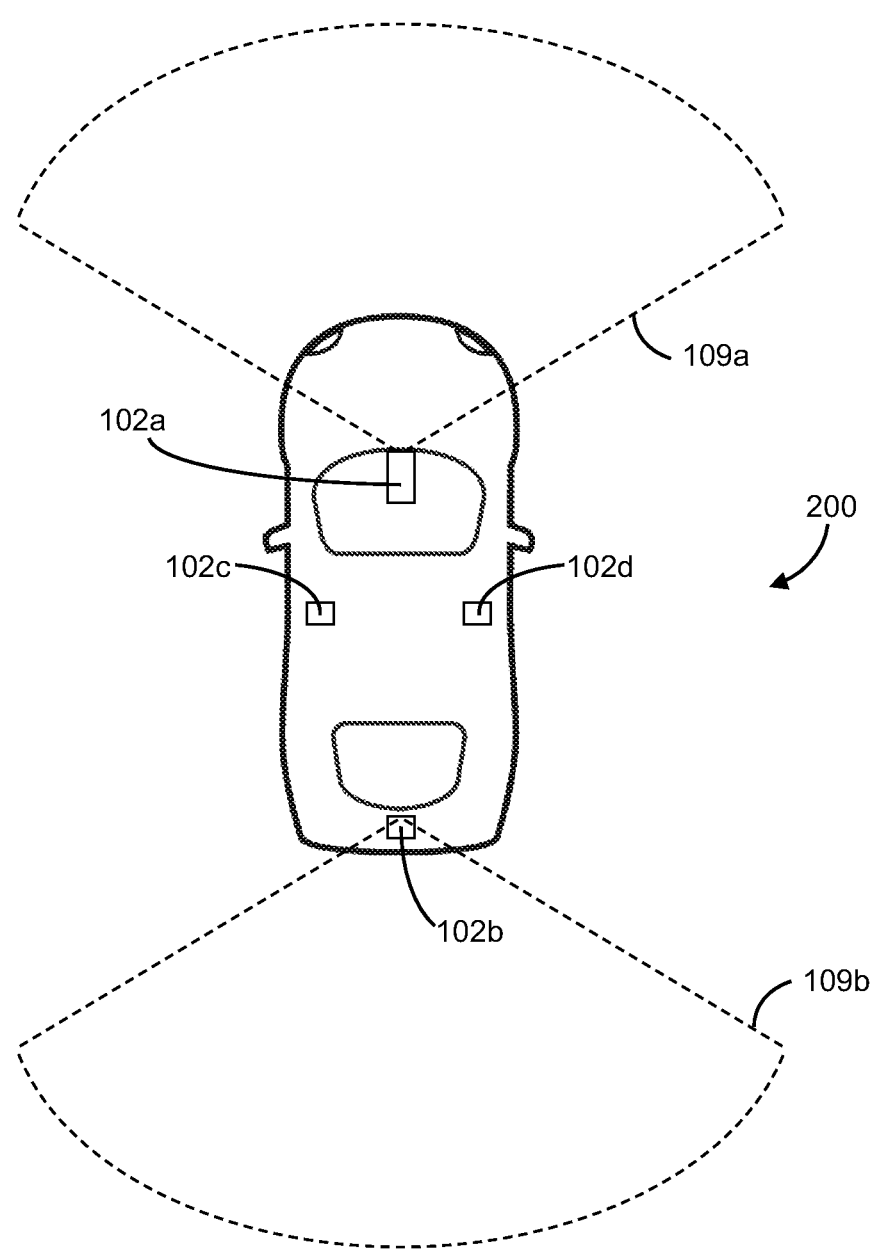
FIG. 2 is a top plan view of a host vehicle including the vehicle computing system.

FIG. 2 generally shows and illustrates host vehicle 200, which includes computing system 100. Some of the local sensors 102 are mounted on an exterior of host vehicle 200 (others are located inside the vehicle 200). Local sensor 102a is configured to detect objects leading the vehicle 200. Local sensor 102b is configured to detect objects trailing the vehicle 200 as indicated by trailing sensing range 109b. Left sensor 102c and right sensor 102d are configured to perform similar functions for the left and right sides of the vehicle 200.

As previously discussed, local sensors 102a to 102d may be ultrasonic sensors, lidar sensors, radar sensors, infrared sensors, cameras, microphones, and any combination thereof, etc. Host vehicle 200 includes a plurality of other local sensors 102 located in the vehicle interior or on the vehicle exterior. Local sensors 102 may include any or all of the sensors disclosed in Miller, Prasad, Lavoie, D'Amato, and Hu.

It should be appreciated that host vehicle 200, and more specifically, processors 108 of host vehicle 200, is/are configured to perform the methods and operations described herein. In some cases, host vehicle 200 is configured to perform these functions via computer programs stored on volatile 107 and/or non-volatile 106 memories of computing system 100.

One or more processors are "configured to" perform a disclosed method step, block, or operation, at least when at least one of the one or more processors is in operative communication with memory storing a software program with code or instructions embodying the disclosed method step or block. Further description of how processors, memory, and software cooperate appears in Prasad. According to some embodiments, a mobile phone or external server(s) in operative communication with host vehicle 200 perform some or all of the methods and operations discussed below.

According to various embodiments, host vehicle 200 includes some or all of the features of vehicle 100a of Prasad. According to various embodiments, computing system 100 includes some or all of the features of VCCS 102 of FIG. 2 of Prasad. According to various embodiments, host vehicle 200 is in communication with some or all of the devices shown in FIG. 1 of Prasad, including nomadic or mobile device 110, communication tower 116, telecom network 118, Internet 120, and data processing center (i.e., one or more servers) 122. Each of the entities described in this application (e.g., the connected infrastructure, the other vehicles, mobile phones, servers) may share any or all of the features described with reference to FIGS. 1 and 2.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." Host vehicle 200 may be a loaded vehicle.

The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels." Host vehicle 200 may be an equipped electric vehicle.

V2X Event Reporting

Figure 3:
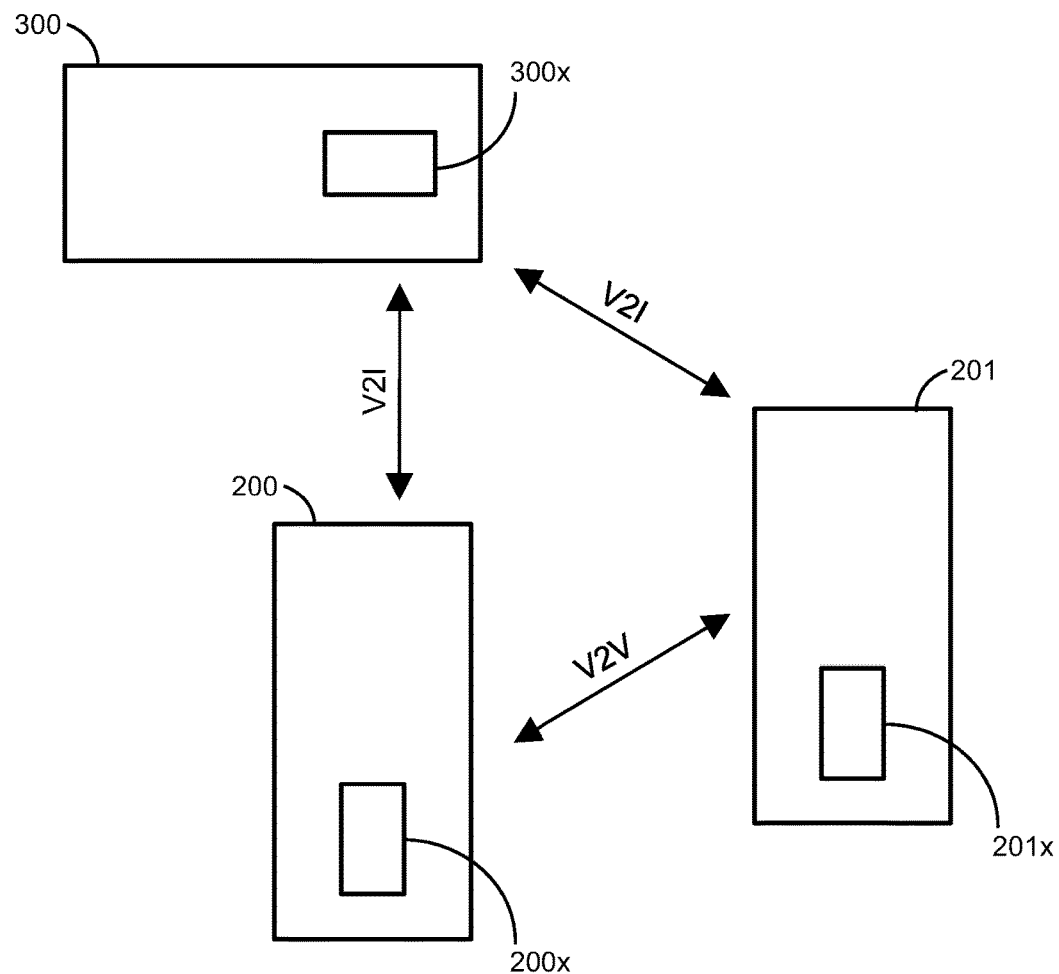
FIG. 3 is a block diagram of V2X communication consistent with the present disclosure.

Referring to FIG. 3, host vehicle 200 is configured to communicate with a base server 300 (which may be a plurality of different servers) and a first vehicle 201. Host vehicle 200 communicates with base server 300 via vehicle-to-infrastructure (V2I) communication techniques. Host vehicle 200 communicates with first vehicle 201 via vehicle-to-vehicle (V2V) communication techniques. First vehicle 201 (which may be identical to host vehicle 200) is configured to communicate with base server 300 via V2I and with host vehicle 200 via V2V. V2X means communication through either V2V or V2I.

V2I communication techniques include wireless communication over the internet. For example, host vehicle 200, via telematics 104, may connect with a cell tower. The cell tower may connect with base server 300 via existing telecommunications infrastructure (e.g., buried cables). V2V communication techniques include direct wireless communication between vehicles without routing through existing telecommunications infrastructure. One known method of V2V communication is DSRC communication, where vehicles directly communicate with each other via short-range radio signals.

Host vehicle 200 stores, updates, and applies a host map 200x. Base server 300 stores, updates, and applies a base map 300x. First vehicle 201 stores, updates, and applies a first map 201x. Maps 200x, 300x, 201x are virtual. Although the term "map" is used, the maps do not need to be displayed, rendered, or user-viewable. The maps may be object-oriented and include a plurality of objects associated with a plurality of attributes. Each map may include (a) static objects (e.g., coordinates/boundaries of roads, intersections) and (b) dynamic objects (e.g., coordinates of vehicles).

Figure 5:
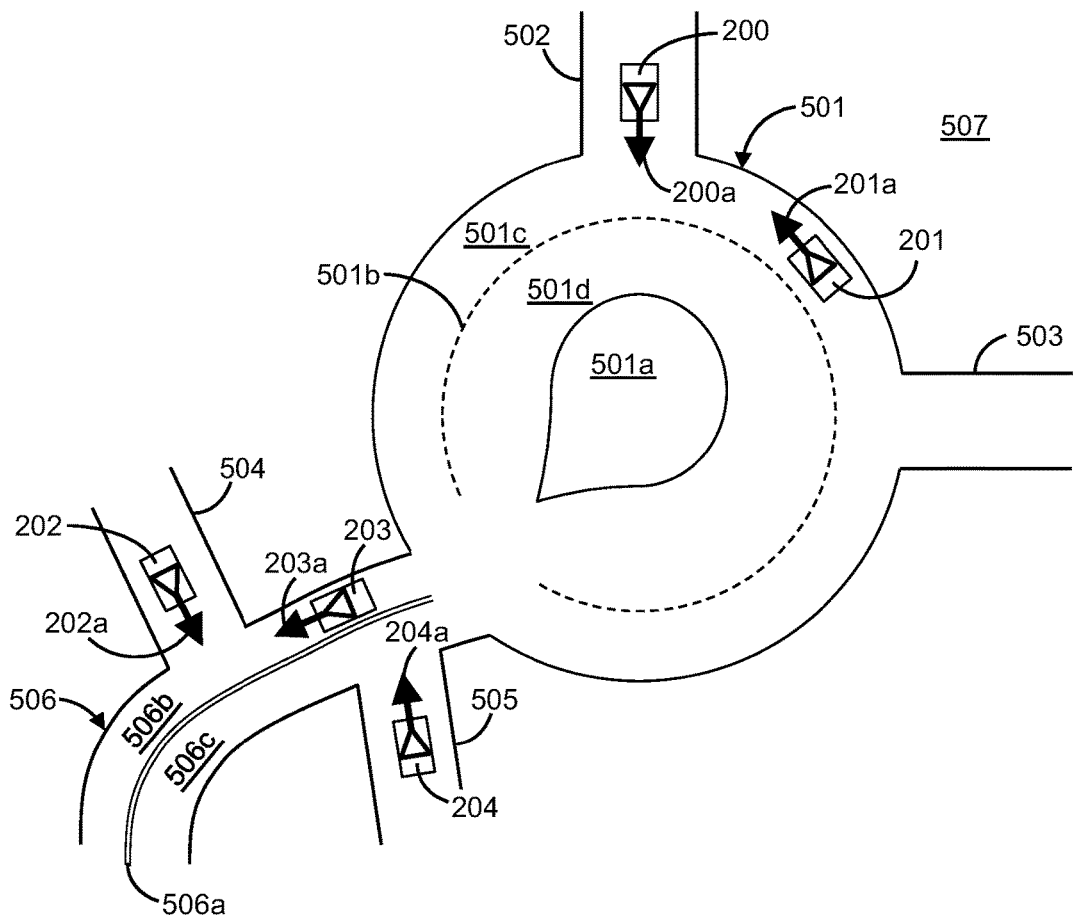
FIG. 5 is a rendered virtual map.

FIG. 5 shows a rendering of an example map 200x, 300x, 201x. The rendering is performed with rendering software that translates objects and associated attributes into a graphical display. Additional explanation of virtual maps appears in U.S. patent Ser. No. 15/418,556 to Diedrich (filed on Jan. 27, 2017), which is hereby incorporated by reference in its entirety. Host vehicle 200 may be configured to perform any and all of the functions described in Diedrich.

In FIG. 5, a traffic circle 501 intersects roads 502, 503, and 506. Road 502 is one-way in the direction from host vehicle 200 toward traffic circle center 501a. Road 506 intersects roads 505 and 504. Traffic circle includes lanes 501c and 501d separated by lane line 501b and a non-drivable center 501a. Lanes 501c and 501d carry parallel traffic flow as indicated by dotted lane line 501b. Road 506 includes lanes 506b and 506c. Lane 506b carries traffic in an opposite direction of lane 506c as indicated by double lane line 506a. Host vehicle 200 is on road 502 with a velocity 200a (velocity includes a speed and a heading). First vehicle 201 is in lane 501c of traffic circle 501 with velocity 200b. Second vehicle 202 is on road 504 with velocity 202a. Third vehicle 203 is in lane 506b of road 506 with velocity 203a. Fourth vehicle 204 is on road 505 with velocity 204a.

Static objects (a) include traffic circle 501, roads 502, 503, 506, and non-driveable center 501a. Attributes of these static objects include their coordinates, the number of lanes, the coordinates of the lanes, the speed limits of the lanes, the traffic directions of the lanes, the allowable turns at any intersections, etc. Dynamic objects (b) include vehicles 200 to 204. Attributes of these dynamic objects include current positions (e.g., GPS coordinates), velocities (which includes heading), vehicle make/model, acceleration, etc.

Host vehicle 200 and first vehicle 201 apply their respective maps 200x, 201x to generate driving outcomes. These driving outcomes may include any of the driving decisions described in Diedrich, such as path planning, automatic steering, automatic braking, collision warnings, etc. Host vehicle 200 may apply host map 200x to autonomously drive host vehicle 200 such that host vehicle 200 does not collide with any dynamic objects and follows all driving rules.

To arrive at maps 200x, 201x, 300x, base server 300 may begin with a street level map (e.g., Google Maps). Base server 300 may then extract static objects from the street level map. Base server 300 supplements the map with dynamic data sensed by external entities (e.g., host vehicle 200, first vehicle 201, infrastructure sensors (e.g., cameras mounted on street lights), etc.). Base server 300 transmits base map 300x to host and first vehicles 200, 201, which then set the base map 300x as host and first maps 200x, 201x. As the vehicles 200, 201 sense new driving events (with their local sensors 102), the vehicles 200, 201 update their maps 200x, 201x. Thus, over time, dynamic objects and properties thereof in host, first, and base maps 200x, 201x, 300x diverge. Among other things, the present application describes methods and operations for periodically converging or synchronizing maps 200x, 201x, 300x.

Figure 4:
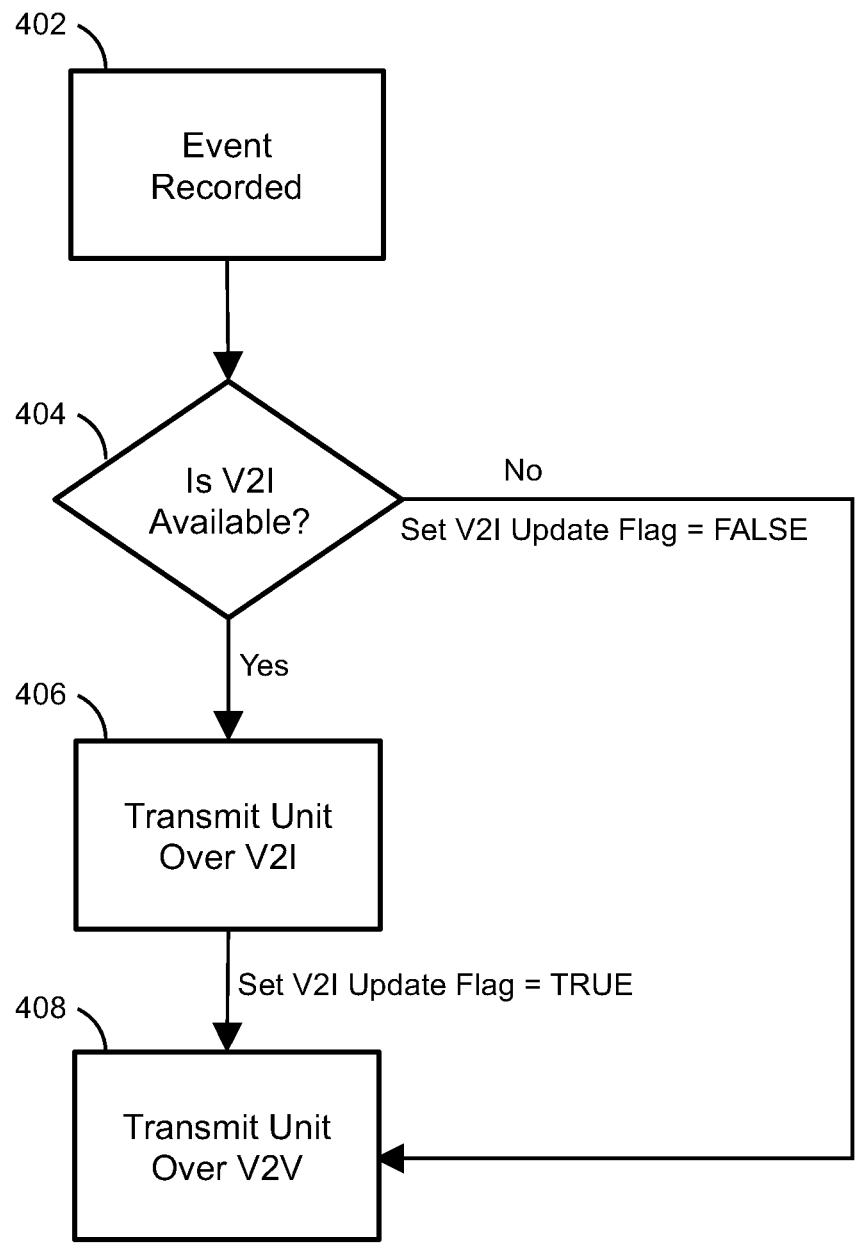
FIG. 4 is a block diagram of appending a flag to V2V communication.

With reference to FIG. 4, host vehicle 200 records a new traffic event with local sensors 102 at block 402. The traffic event may be a position, velocity, and/or acceleration of a dynamic object. The traffic event may thus include new dynamic objects and/or new attributes of dynamic objects. Host vehicle 200 compiles the traffic event (or a collection of traffic events sensed within a predetermined time interval) into a unit or block of information. Host vehicle 200 generates a random series of at least 6 alphanumeric characters and assigns the unit a unit ID equal to the random series. Host vehicle 200 further applies a timestamp to the unit.

At block 404, host vehicle 200 determines whether a V2I connection is available (e.g., whether an Internet connection is available and/or whether host vehicle 200 is capable of currently communicating with base server 300). If the V2I connection is available, then host vehicle 200 transmits the unit (including ID and timestamp) to base server 300. Base server 300 may update base map 300x to reflect objects and/or attributes in the unit. To determine whether to update base map 300x based on the unit, base server 300 may run a relevancy operation (discussed below). In response to the unit, base server 300 may send a confirmation receipt to host vehicle 200. The confirmation receipt may be timestamped, have a unique receipt ID, and list whether the unit was accepted (i.e., applied to base map 300x) or rejected.

Upon transmission to base server 300 or upon a confirmation receipt from base server 300, host vehicle 200 supplements the unit (which is still stored on host vehicle 200) with a true V2I update flag. At block 406, host vehicle 200 reports the unit, including the unit ID, the true V2I update flag, and the timestamp over V2V, thus potentially causing first vehicle 201 to update first map 201x in the same manner as base map 300x.

If, at block 404, the V2I connection is unavailable (e.g., host vehicle 200 lacks a cellular connection or host vehicle 200 determines that base server 300 is offline), then host vehicle 200 supplements with unit of information with a false V2I update flag. At block 406, host vehicle 200 sends the unit, including the unit ID, the timestamp, and the false V2I update flag, over V2V to first vehicle 201. It should be appreciated that V2V communications/broadcasts/messages described herein may be a point-to-point unicast between host vehicle 200 and the target vehicle or may be a generic broadcast by host vehicle 200, which is received by any vehicle within range of the broadcast.

Figure 6:
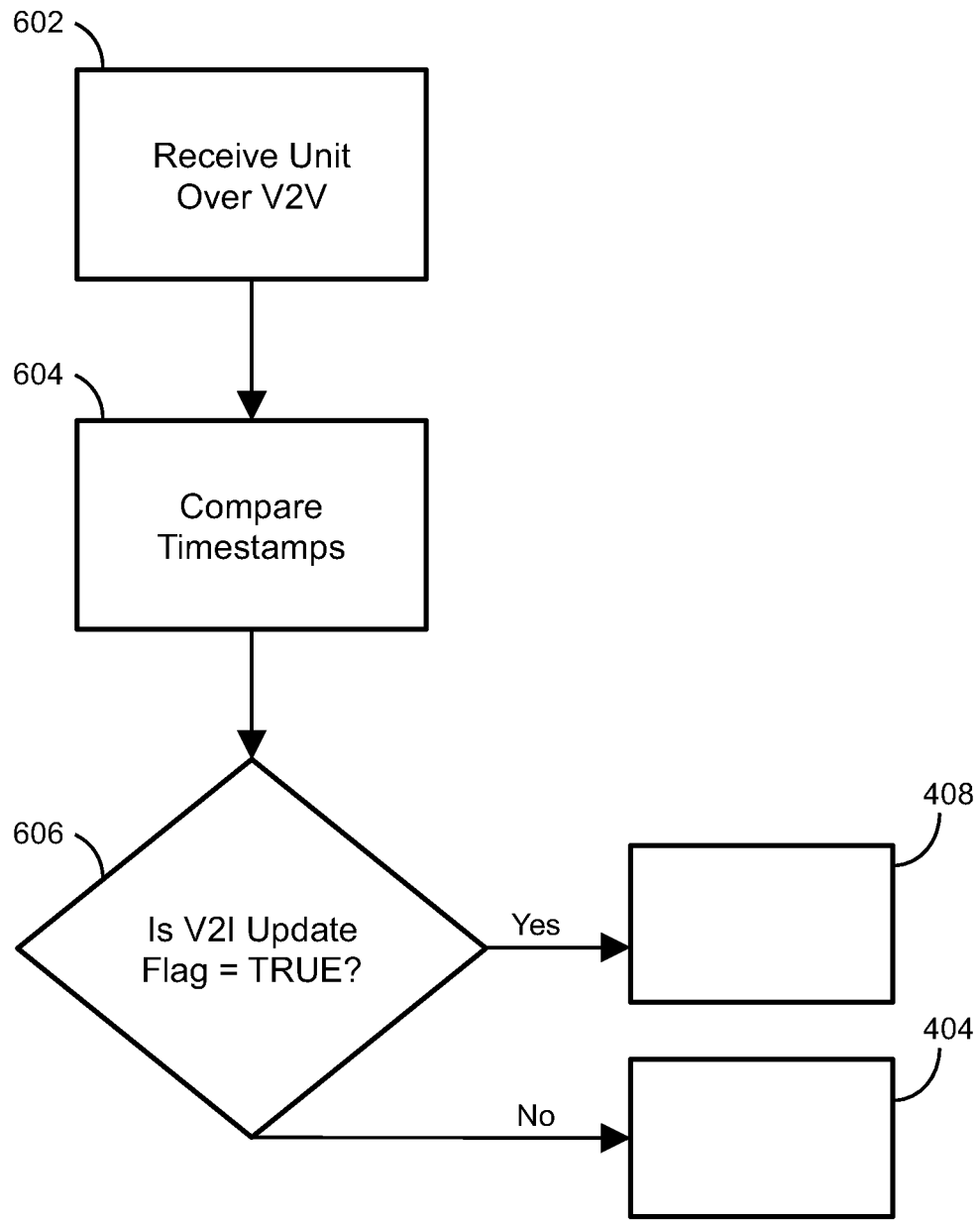
FIG. 6 is a block diagram of processing a V2V communication.

Referring to FIG. 6, host vehicle 200 receives a unit over V2V at block 602 (e.g., from first vehicle 201, which has performed the steps of FIG. 4). At block 604, host vehicle 200 compares the unit timestamp with a timestamp of a most recent synchronization or convergence with base server 300. As described above, base server 300 periodically sends out base map 300x (or at least relevant portions thereof based on a location of the receiving vehicle) to vehicles over V2I (e.g., twice per second). The vehicles may replace the vehicle maps 200x, 201x with the most recent base map 300x. The vehicles may replace only portions of the vehicles maps 200x, 201x with the most recent base map 300x based on the below-discussed relevancy operation.

At block 604, host vehicle 200 determines whether host map 200x or the unit has a more recent timestamp. If host map 200x has a more recent timestamp, then the unit is ignored. If the unit has a more recent timestamp, then host vehicle 200 determines whether the unit has a true or false V2I update flag at block 606. Block 604 may include the below-discussed relevancy operations. If the V2I update flag is false, then host vehicle 200 proceeds to block 404 of FIG. 4. If the V2I update flag is true, then host vehicle 200 proceeds to block 408 of FIG. 4.

The above discussed relevancy operations will now be described. As previously discussed, a unit may include attributes of a plurality of objects (e.g., velocity of host vehicle 200 and velocity of first vehicle 201). For reasons that will become apparent, each unit may be broken into subunits. Each subunit may include a randomly generated ID, a timestamp. Each subunit may substantively report attributes of a single object.

For example, host vehicle 200 is one object having a plurality of attributes (also referred to as properties). First vehicle 201 is one object having a plurality of attributes. Thus, the above entities (e.g., host vehicle 200, first vehicle 201, base server 300), upon receiving a unit, may unpack the unit into its constituent subunits. The entity may then compare the timestamp of the subunit (which deals with a single object) to the most recent timestamp corresponding to the same object in the entity's map.

The entity may then accept subunits having a fresh timestamp (i.e., a timestamp more recent than the timestamp of the same object in the entity's map) and reject subunits having a stale timestamp (i.e., a timestamp less recent than the timestamp of the same object in the entity's map). For example, first vehicle 201 transmits, over V2I a unit having: (a) a first subunit with attributes of host vehicle 200 (position, velocity, acceleration) and (b) a second subunit with attributes of first vehicle 201 (position, velocity, acceleration). The timestamp of the first subunit, corresponding to the latest time when the attributes were sensed (e.g., the time of the last sensor measurement that contributed to any of the attributes) is 3:01:01 pm. The timestamp of the second subunit, corresponding to the latest time when the attributes were sensed, is 3:01:03 pm. Base map 300x has a most recent timestamp for host vehicle 200 at 3:01:05 pm. Base map 300x thus rejects the first subunit. Base map 300x has a most recent timestamp for first vehicle 201 of 3:01:02 pm. Base map 300x thus accepts the second subunit.

The same process may be applied when base server 300 issues updates to host and first vehicles 200, 201. Each update may include attributes of objects within a predetermined distance of the receiving vehicle (e.g., within a two mile radius of host vehicle 200). Each object in the update is timestamped. The receiving vehicle then compares the timestamp of each object in the update with the timestamp of the same object in the receiving vehicle's map. The receiving vehicle accepts portions of the update that are fresh and rejects portions of the update that are stale.

Although units were previously described as including information about dynamic objects, units may also include information about static objects. Base server 300 may be configured to issue updates about dynamic objects at a first interval and issue updates about static objects at a second interval. The first interval may inversely correlated with the receiving vehicle's speed (i.e., at higher speeds, the updates come more frequently). The second interval may be negatively correlated with the receiving vehicle's speed, but be set as some multiple of the first interval. For example, base server 300 may send out updates of dynamic objects every 0.5 seconds and send out updates of static objects every 2 seconds. Thus, one in four units broadcast by base server 300 will include dynamic objects and static objects while three in four units broadcast by base server only include dynamic objects.

The vehicles 200, 201 may sense attributes of static objects (e.g., coordinates of lanes) in addition to attributes of dynamic objects. The vehicles 200, 201 may compare the attributes of the static objects to attributes in the vehicle's map 200x, 201x and only include attributes of static objects in the transmitted units when the sensed static attributes differ (e.g., differ by a predetermined amount) from the static attributes resident in the vehicle's map 200x, 201x.

Base server 300 may be configured to be cautious about updating attributes of static objects. Upon receiving a subunit with static object attributes, base server 300 compares the received attributes with attributes in the base map 300x. Base server 300 then decides whether the comparison has resulted in (a) no difference, or (b) a difference If the comparison results in (a) no difference, then base server 300 ignores the attributes of the subunit. If the comparison results in (b) a difference, then base server stores the subunit and determines a credibility of the transmitting vehicle.

Base server 300 may determine credibility by requiring that the vehicle transmit subunits about sensed static objects for at least a predetermined period of time (even if sensed attributes of the static objects do not differ from the mapped attributes of the static objects). Base server 300 then compares attributes in the transmitted subunits with the same attributes (i.e., attributes of the same object) in base map 300x. If the attributes are consistent, then base server 300 assigns a positive credibility to the vehicle. If the attributes are inconsistent, then base server 300 assigns a negative credibility to the vehicle. If more than one vehicle is marked as having a negative credibility after reporting new attributes of the same object within a predetermined time interval, then base server 300 may apply a different algorithm to determine credibility.

If the vehicle has a positive credibility, then base server 300 issues a blurring update to the base map 300x. The blurring update causes vehicles to (i) sense and immediately report attributes of the blurred object and (ii) reduce their confidence in the attributes of the blurred object. Base map 300x removes the blur and reverts to the pre-blurred object upon receiving a sufficient number of subsequent subunits (e.g., one subunit) consistent (i.e., sufficiently consistent) with the pre-blurred base map 300x, timestamped after application of the blur, and coming from a vehicle different than the original vehicle. Base server 300 adjusts base map 300x to reflect the difference and removes the blur upon receiving a sufficient number of subsequent subunits consistent with the reported difference.

Host and first vehicles 200, 201 may perform the same relevancy operations upon receiving subunits corresponding to static objects from any entity other than host server 300.

Multi-Hop V2V Querying

Figure 7:
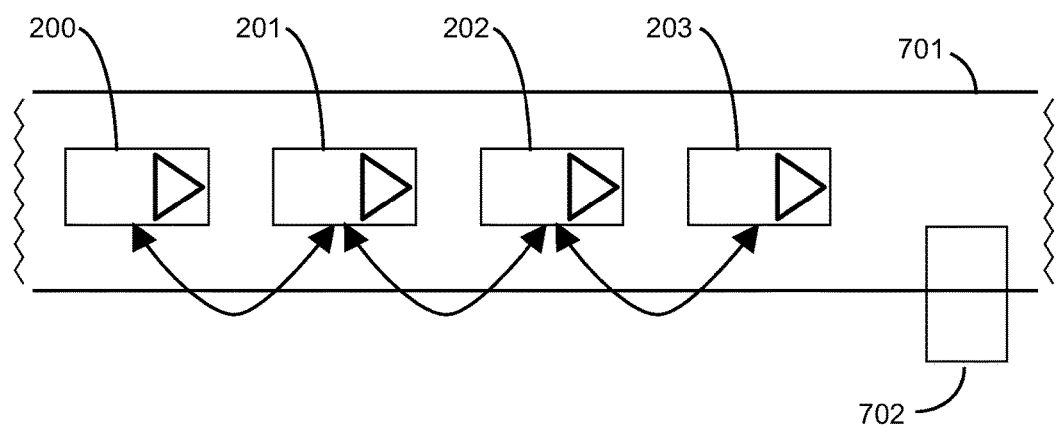
FIG. 7 is a schematic of V2V message propagation.

Referring to FIG. 7, host map 200x includes an obstruction 702. The obstruction may be a parked vehicle blocking road 701. Host vehicle 200 has also lost V2I connection with base server 300. Based on the presence of obstruction 702 and/or the lost V2I connection with base server 300, host vehicle 200 requests information about upcoming road. Host vehicle 200 is particularly interested in the status of obstruction 702. The local sensors 102 of host vehicle 200, first vehicle 201, and second vehicle 202 are out of sensing range of obstacle 702 while the local sensors 102 of third vehicle 203 (which, like first vehicle 201 and second vehicle 202, may be identical to host vehicle 200) are within sensing range of obstacle 702.

Figure 8:
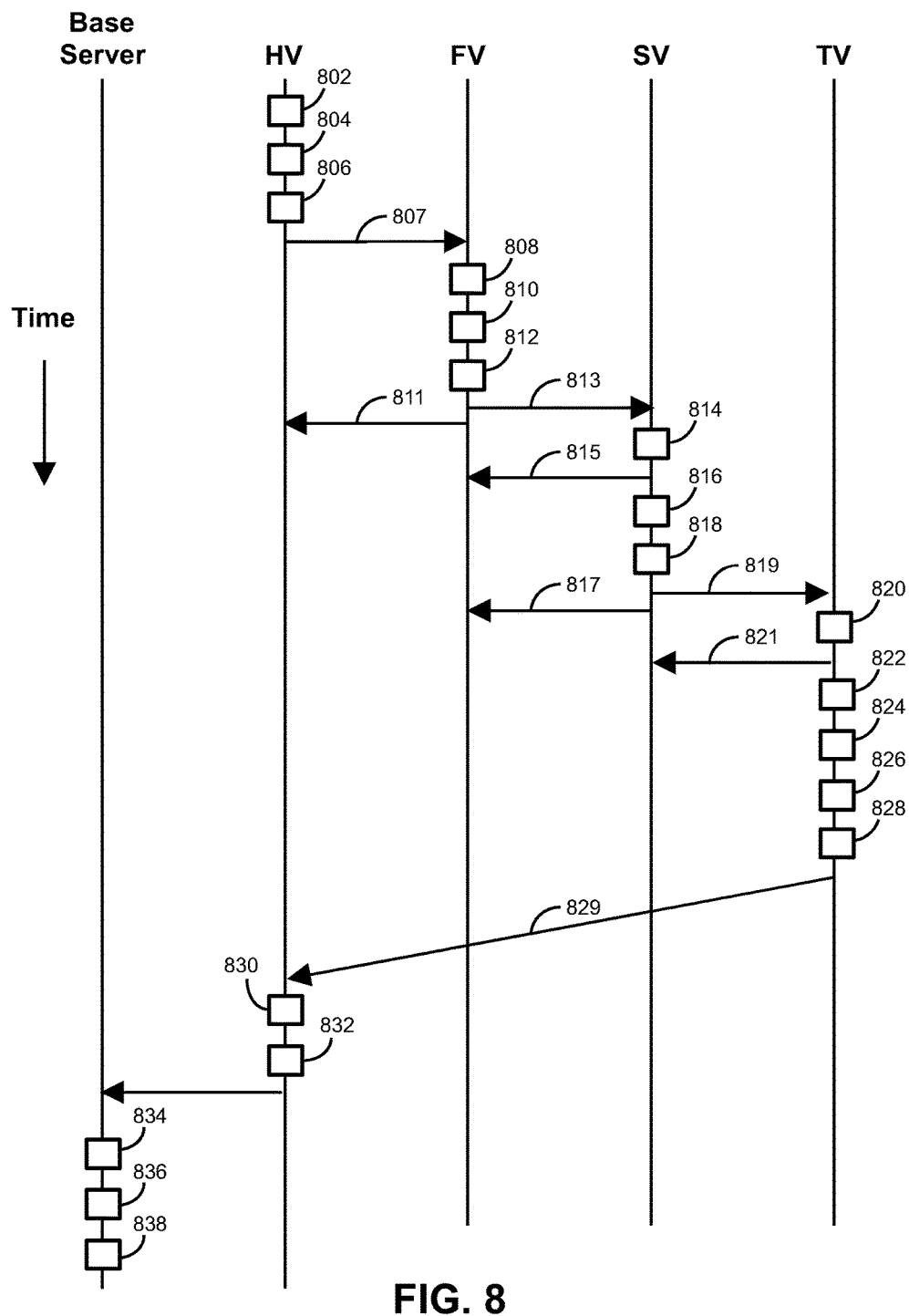
FIG. 8 is a block diagram of V2V message propagation.

Referring to FIG. 8, host vehicle 200 determines that the of V2I connection has been lost at block 802. At block 804, host vehicle 200 identifies an area of interest (e.g., all dynamic objects within a certain set of coordinates, here, within a set of coordinates about obstacle 702) based on host map 200x. At block 806, host vehicle 200 prepares a message including one or more of: (a) the area of interest, (b) the projected route of host vehicle 200 (which may include current and/or future positions, velocities, and accelerations), (c) the identity of host vehicle 200, and (d) a kind and/or resolution of desired information about the area of interest. Host vehicle 200 broadcasts the message via V2V at 807.

At block 808, first vehicle 201 receives the broadcast message and issues a receipt confirmation (not shown) to host vehicle 200. At block 810, first vehicle 201 determines whether it is in sensing range of the area of interest. If first vehicle 201 is within sensing range, then first vehicle 201 performs the operations discussed below with reference to third vehicle 203. If not, based on (b), first vehicle 201 estimates a current position of host vehicle 200. First vehicle 201 compares the estimated current position of host vehicle 200 with the known position of first vehicle 201 and the area of interest. If first vehicle 201 is closer to the area of interest than host vehicle 200 is projected to be, then first vehicle 201 proceeds to block 812. At block 812, first vehicle 201 appends (c-1) to the message [the identity of first vehicle 201]. First vehicle 201 forwards the message via V2V at 813 and informs host vehicle of the forwarding at 811. Before forwarding the message, first vehicle 201 applies forwarding selection operations. During these operations, first vehicle 201 determines all V2V equipped (i.e., connected) vehicles within broadcast range of first vehicle 201. First vehicle 201 selects the vehicle that is (i) closest to the area of interest from the determined vehicles and/or (ii) heading in the direction of the area of interest. First vehicle 201 broadcasts the message to the selected vehicle.

At block 814, second vehicle 202 receives the broadcast message. Based on the receipt, second vehicle 202 issues a receipt confirmation to first vehicle 201 at 815. At block 816, second vehicle 202 determines whether it is in sensing range of the area of interest. If second vehicle 202 is within sensing range, then second vehicle 202 performs the operations discussed below with reference to third vehicle 203. If not, based on (b), second vehicle 202 estimates a current position of host vehicle 200. Second vehicle 202 compares the estimated current position of host vehicle 200 with the known position of second vehicle 202 and the area of interest. If second vehicle 202 is closer to the area of interest than host vehicle 200 is projected to be, then second vehicle 202 proceeds to block 818. At block 818, second vehicle 202 appends (c-2) to the message. Second vehicle 202 forwards the message at 819 and informs first vehicle 201 of the forwarding at 817. Before forwarding the message, second vehicle 202 applies the forwarding selection operations.

At block 820, third vehicle 203 receives the message. Third vehicle 203 issues a receipt confirmation to second vehicle 202 at 821. Third vehicle 203 determines that is within sensing range of the obstacle (or will be within sensing range of the obstacle within a predetermined period of time based on velocity, acceleration, path, etc). At block 822, third vehicle 203 senses the area of interest based on (a) and (d). At block 824, third vehicle 203 appends (c-3) to the message. At block 826, third vehicle 203 appends the sensed data (which may be objects and attributes thereof) to the message and deletes (b) and (d). At block 828, third vehicle 203 estimates a current location of host vehicle 200 based on (b). Third vehicle 203 forwards the message and informs second vehicle 203 of the forwarding (not shown). Before forwarding the message, third vehicle 203 applies the forwarding selection operations, but selects the vehicle closest to the estimated current location of host vehicle 200 and/or the vehicle that is heading toward the estimated current location of host vehicle 200.

The process is repeated until the message returns to host vehicle 200 at block 830. Although the message may return to host vehicle 200 via first vehicle 201 and second vehicle 202, such an arrangement is not necessary. The message may take a different path 829 back to host vehicle 200 than the message took to third vehicle 203 (e.g., through fourth and fifth vehicles). If any broadcasting vehicle fails to receive a receipt confirmation, then the vehicle may re-broadcast to a different vehicle, selected with a new iteration of the forwarding selection operations.

At block 830, the message will include the identities of every intermediate vehicle and the sensing vehicle. At block 832 host vehicle 200 updates host map 200x based on the data sensed by third vehicle 203. Host vehicle 200 transmits the identities of the intermediate vehicles and the sensing vehicle to base server 300 upon reconnection with base server 300.

At block 834, the base server 300 debits an account of host vehicle an amount of money or redeemable points based on (i) the original distance of host vehicle 200 from the area of interest and (ii) the level of sensing quality and/or quantity originally requested by host vehicle 200. At block 836, the base server 300 credits an account with money or redeemable points associated with third vehicle 203 (i.e., the vehicle that performed the sensing) based on (ii). At block 838, the base server 300 credits accounts (with money or redeemable points) of each intermediate vehicle (here, first vehicle 201 and second vehicle 202) with an amount based on (i). Host vehicle 200 may be configured such that for the multi-hop querying function to be active on host vehicle 200, host vehicle 200 must attempt to establish connection with base server 300 at predetermined intervals to enable the credits and debits.

Base server 300 is connected to a financial server (not shown), which periodically transfers funds between accounts (e.g., bank accounts, credit cards, etc) based on the above-described credits and debits.

The invention claimed is:

1. A host vehicle comprising:
a sensor to detect a traffic event; and
processor(s) to:
package the traffic event into a unit;
determine whether a vehicle-to-infrastructure (V2I) connection is active or inactive;
if active, append a TRUE flag to the unit and transmit the unit via the V2I connection and a vehicle-to-vehicle (V2V) connection; and
if inactive, append a FALSE flag to the unit and transmit the unit via the V2V connection.

2. The host vehicle of claim 1, wherein the processor(s) are configured to:
receive a second unit from another vehicle via the V2V connection;
determine whether the second unit includes a TRUE flag or a FALSE flag;
if the second unit includes a FALSE flag, transmit the second unit to a server via the V2I connection; and
if the second unit includes a TRUE flag, not transmit the second unit to the server via the V2I connection.

3. The host vehicle of claim 2, wherein the processor(s) are configured to compare a unit timestamp of the second unit to a map timestamp of a virtual map of the host vehicle prior to determining whether the second unit includes a FALSE flag or a TRUE flag.

4. The host vehicle of claim 3, wherein the processor(s) are configured to discard at least a portion of the second unit if the unit timestamp precedes the map timestamp.

5. The host vehicle of claim 4, wherein the processor(s) are configured to forward the second unit via the V2V connection.

6. The host vehicle of claim 1, wherein the processor(s) are configured to:
unpack a received message into subunits, each subunit including attributes of a single object and a timestamp; and
match each subunit with a previously stored object resident in a memory.

7. The host vehicle of claim 6, wherein each previously stored object includes a timestamp and the processor(s) are configured to:
compare the timestamps of the previously stored objects with the timestamps of the subunits;
mark each subunit as fresh or stale based on the comparison;
discard stale subunits; and
update attributes of the previously stored objects based on the attributes of fresh subunits.

8. The host vehicle of claim 1, wherein:
the traffic event includes a dynamic object and attributes of the dynamic object; and
the processor(s) are configured to include a unit ID and a timestamp in the unit.

9. The host vehicle of claim 8, wherein the unit includes a request to perform a sensor scan of the dynamic object.

10. The host vehicle of claim 9, wherein the processor(s) are configured to:

select an external vehicle from a plurality of external vehicles within vehicle-to-vehicle broadcast range of the host vehicle; and direct the request to the selected external vehicle.

11. The host vehicle of claim 1, wherein the processor(s) are configured to update a virtual map of the host vehicle with the traffic event.

12. The host vehicle of claim 11, wherein the processor(s) are configured to autonomously drive the host vehicle based on the virtual map.

13. The host vehicle of claim 11, wherein the processor(s) are configured to enable a server to update the virtual map via the V2I connection.

14. The host vehicle of claim 1, wherein the TRUE flag instructs another vehicle not to transmit the unit to a server and the FALSE flag instructs the other vehicle to transmit the unit to the server.

15. A method of controlling a host vehicle, which comprises memory, sensor(s), processor(s), the method comprising:

detecting a traffic event via the sensor(s);

updating, via the processor(s), a virtual map that is stored in the memory with the traffic event;

packaging the traffic event into a first unit;

determining whether a vehicle-to-infrastructure (V2I) connection is active or inactive;

if active, appending a TRUE flag to the first unit and transmitting the first unit via the V2I connection and a vehicle-to-vehicle (V2V) connection; and if inactive, appending a FALSE flag to the first unit and transmitting the first unit via the V2V connection.

16. The method of claim 15, further comprising:

receiving a second unit from another vehicle via the V2V connection;

determining whether the second unit includes a TRUE flag or a FALSE flag;

if the second unit includes a FALSE flag, transmitting the second unit to a server via the V2I connection; and if the second unit includes a TRUE flag, not transmitting the second unit to the server via the V2I connection.

17. The method of claim 16, further comprising comparing a unit timestamp of the second unit with a map timestamp of the virtual map stored on the host vehicle prior to determining whether the second unit includes a FALSE flag or a TRUE flag.

18. The method of claim 17, further comprising discarding at least a portion of the second unit if the unit timestamp precedes the map timestamp.

19. The host vehicle of claim 18, further comprising forwarding the second unit via the V2V connection.

20. The method of claim 15, further including autonomously driving the host vehicle, via the processor(s), based on the virtual map.

* * * * *